July 17, 1951 — M. D. BURROWS ET AL — 2,561,008
HANDLE FOR LAWN MOWERS AND THE LIKE
Filed Feb. 28, 1949 — 2 Sheets-Sheet 2
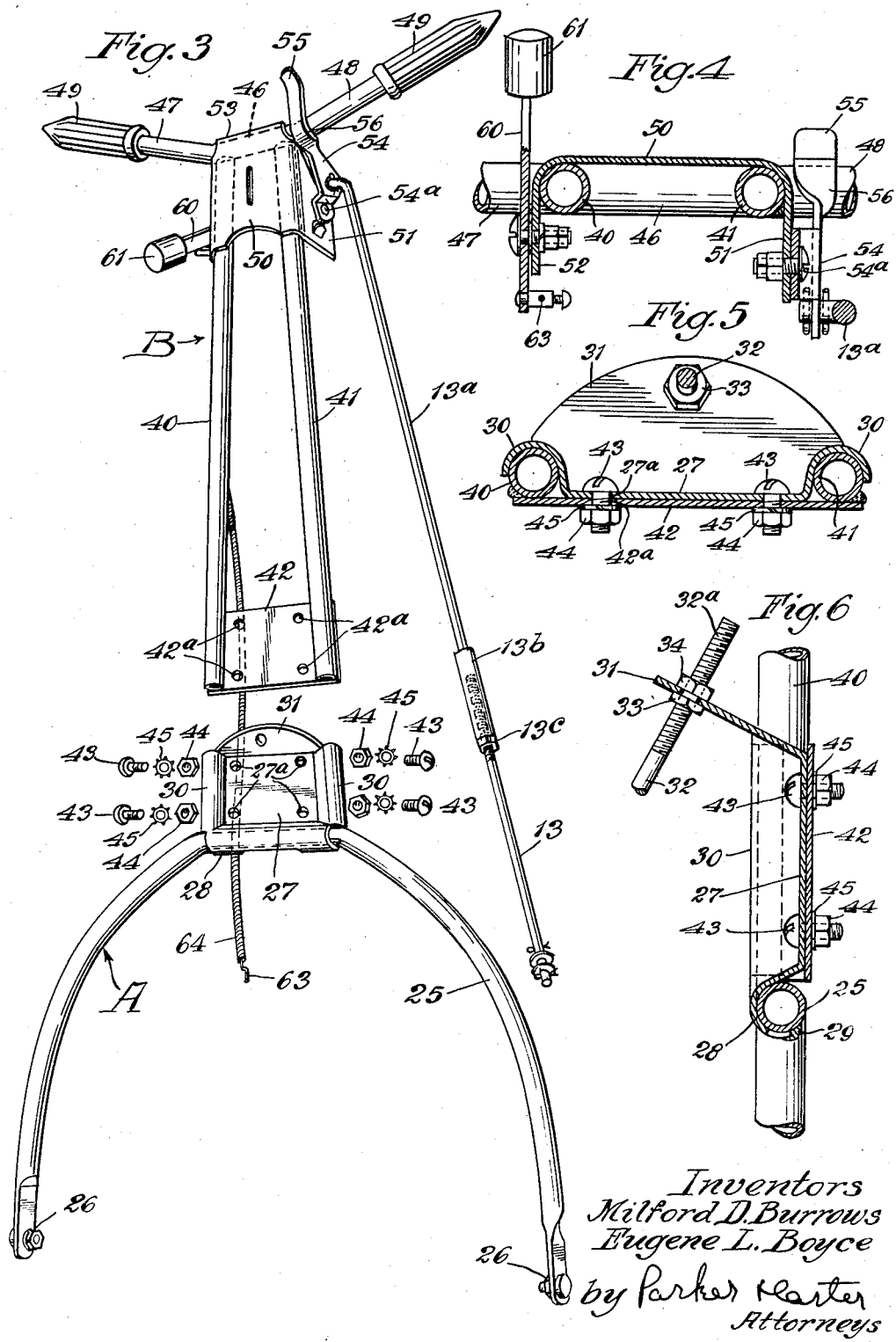
Inventors
Milford D. Burrows
Eugene L. Boyce
by Parker Carter
Attorneys Patented July 17, 1951

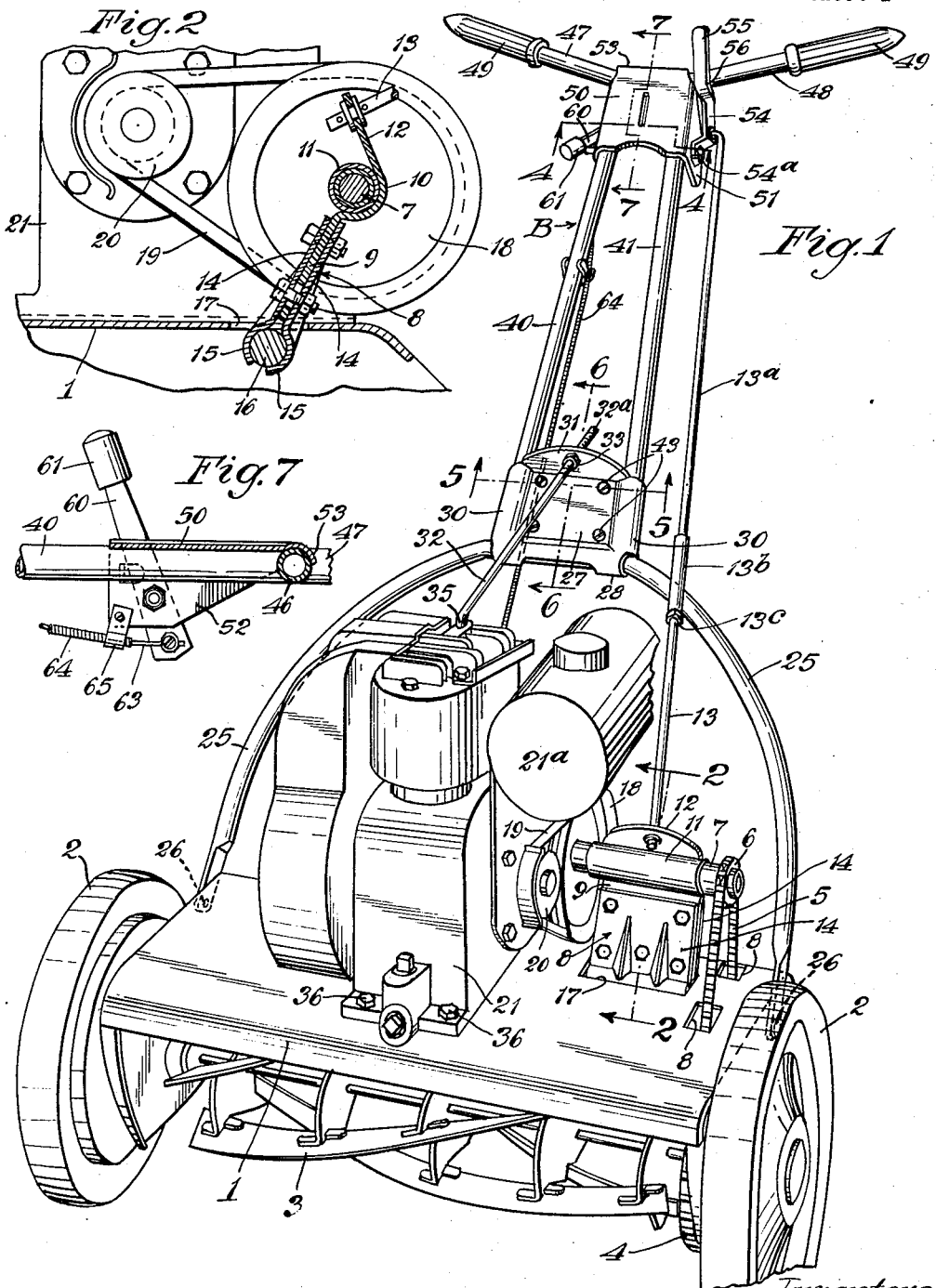

2,561,008

UNITED STATES PATENT OFFICE 2,561,008

HANDLE FOR LAWN MOWERS AND THE LIKE

Milford D. Burrows and Eugene L. Boyce, Chicago, Ill., assignors to Pioneer Gen-E-Motor Corporation, Chicago, Ill., a corporation of Delaware Application February 28, 1949, Serial No. 78,743

4 Claims. (Cl. 74—488)

Our invention relates to an improvement in handles for lawn mowers and the like.

One purpose is to provide an improved lawn mower handle adapted for use with motor driven lawn mowers.

Another purpose is to provide an improved handle structure and an associated control assembly for the motor and moving parts of a lawn mower.

Another purpose is to provide a lawn mower handle and control assembly which shall be simple, efficient and strong.

Another purpose is to provide a control assembly which is readily operable by the user.

Other purposes will appear from time to time in the course of the specification and claims.

Referring to the drawings,

Figure 1 is a perspective view.

Figure 2 is a section on an enlarged scale on the line 2—2 of Figure 1.

Figure 3 is a perspective view of the handle with parts disassembled.

Figure 4 is a section on an enlarged scale on the line 4—4 of Figure 1.

Figure 5 is a section on an enlarged scale on the line 5—5 of Figure 1.

Figure 6 is a section on an enlarged scale on the line 6—6 of Figure 1; and

Figure 7 is a section on an enlarged scale on the line 7—7 of Figure 1.

Like parts are indicated by like symbols throughout the specification and drawings.

Referring to the drawings, 1 generally indicates the chassis of a lawn mower. The chassis is shown as mounted on ground-engaging wheels 2. 3 indicates any suitable lawn mower cutting reel which may be driven, for example, through a sprocket 4, chain 5, and sprocket 6 on the shaft 7. The top of the chassis is cut away as at 1a to permit the passage of the sprocket chain 5. The shaft 7 is rotatively mounted on a bracket generally indicated as 8. This bracket is shown as including an upper plate 9 having a portion bent as at 10 to receive a sleeve 11. It extends upwardly as at 12 to receive a control rod 13, the purpose of which will later appear. The lower edge or portion of the plate 9 is adjustably gripped between clamp elements 14, the lower ends of which are bent as at 15 to surround a shaft 16 which may be rotatably mounted on the lower side of the top of the chassis 1. The chassis 1 is cut away as at 17 to permit movement or oscillation of the bracket structure thus formed about the center of the shaft 16. The shaft 7 carries at one end the sprocket 6 and at the other end any suitable belt-engaging wheel 18 suitably channeled to receive a belt 19 which passes about the drive pulley 20 of the motor structure generally indicated as 21. It will be understood that when the bracket is moved by the control rod 13 in a direction to tension the belt 19 then, when the motor is in operation, the belt 19 will rotate the shaft 7 and, through it, the cutter reel 3.

To provide an efficient handle structure, we employ a bow 25 secured to the chassis 1 at its opposite ends as at 26. The bow 25 carries at its upper intermediate portion a plate 27 having curved portions 28 which surround the bow 25 and may be welded to it as at 29. The frame thus formed has curved side portions 30 and an upwardly and forwardly inclined top extension 31 which receives a positioning rod 32 which may be adjustably secured by the opposite nuts 33, 34. The lower end 35 of the rod may be secured to the lower part of the motor 21. The motor 21 is firmly secured to the chassis 1 by securing means which may include, for example, the screws 36. The nuts 33 and 34 on the screw-treated portion 32a of the upper end of the rod 32 permit the bow 25 to be adjusted in relation to the engine and shaft to a desired upward and rearward angular projection. It will be understood that, when the device is shipped knocked down, the bow unit, as shown in Figure 3 is ready to be secured to adjacent portions of the device. For example, we illustrate a separable upper handle portion which includes side rods 40, 41, which may, if desired, converge upwardly slightly. At the lower ends they are secured to a plate 42. The plates 27 and 42 are provided with suitable opposed and alignable apertures 27a and 42a through which may pass any suitable securing screws 43 which receive nuts 44 and locking members 45. Thus the handle structure may be quickly assembled, with the lower ends of the tubes 41 and 42 extending into and conforming to the side portions 30 of the plate 27. The upper ends of the tubes 40, 41, may be connected by a cross-tube 46 having upwardly and rearwardly inclined end portions 47, 48, which may carry handles 49 of any suitable material. Extending about the upper portions of the members 40, 41 and the intermediate cross-piece 46 is a top plate 50 having downwardly extending side flanges 51, 52. The plate has an upper edge 53 which extends about and conforms closely to the member 46. The plate 50 may be welded or otherwise secured to the tubular portions above described. The side flange 51 of the plate 50 has pivoted thereto as at 54a a lever 54 having an actuating portion 55 and an intermediate bend or portion 56 which may abut against the tube element 48. Secured to lever 54 is the control rod 13a which constitutes an extension of the control rod 13. The parts are connected by any suitable adjusting sleeve 13b, whereby the length of the control rod may be varied and set by the lock nut 13c. It will be understood that the parts are so proportioned that when the handle 55 is in the position in which it is shown in Figure 1, the bracket 8 is moved into the position in which it is shown in Figure 2, and, if the motor is running, a drive is provided through to the cutter reel 3.

On the opposite flange 52 is pivoted any suitable lever 60 with its handle 61. The lever has secured thereto a control wire 63 which extends through any suitable flexible sheath 64 the upper end of which is secured as by the clip 65 to the flange 52. It will be understood that we may employ the conventional Bowden wire extending to the motor 21 and serving as a throttle control or a control for varying and controlling the rate of operation of the motor; for example by controlling its fuel supply from the fuel tank 21a. Since the details of such engine or throttle control do not of themselves form part of the present invention, they are not shown herein.

It will be realized that whereas we have described and claimed a practical and operative device, nevertheless many changes may be made in size, shape, number, and disposition of parts without departing from the spirit of the invention, and we therefore wish our description and drawings to be in a broad sense illustrative and diagrammatic rather than as limiting us to our precise showing.

The use and operation of the invention are as follows:

We provide a simple, efficient and compact handle and control structure for motor driven lawn mowers and like devices which is compact and strong, but which may nonetheless readily be shipped broken down and dismantled, and which, when assembled, provides a powerful and efficient handle. It is important, in shipping devices of this kind, that the handle be easily taken down and that, also, it be readily and firmly mounted in a secure operating position. We employ a handle which breaks down into two major elements. There is, first, the assembly A of Figure 3 which includes the bow 25 and its associated parts and the assembly B of Figure 3 which includes the upper part of the handle and the associated control members. The parts may be quickly and strongly secured by inter-fitting and interposing the plates 27 and 42 with the lower ends of the tubes 40 and 41 entering the rounded or partly tubular side portions 30 of the plate 27. When so assembled, the securing screws 43 are effective to hold the parts firmly together in a firm and solid structure. The Bowden wire is shipped secured to the upper unit B and, since it is a flexible element, its lower end can readily be secured to the unit. The control rod 13, 13a is also shipped secured as a part of the unit B. Since it is adjustable as to length, it may readily be adjusted, when the handle has been secured together, to the flange 12 of the bracket 8. Since the connection between the rod 32 and the flange 31 of the plate 27 is also adjustable, it is easy to adjust the position or angle of the handle in relation to the motor and chassis, and to make a compensating adjustment of the length of the operating rod 13, 13a. We prefer to weld or permanently secure the plate 27 to the bow 25 and the plates 42 and 50 to the upper handle assembly B. In effect, we provide a strong strut system which, when the parts are in the position shown in Figure 1, provides a firm and efficient and easily adjusted handle and control structure for motor driven lawn mowers.

We claim:

1. In a handle structure for lawn mowers and the like, a bow portion having ends adapted to be secured to the opposite sides of the chassis of a lawn mower, and a handle portion having tubular side elements, a plate secured to said bow portion and a plate secured to said handle portion, said plates being formed to abut and having therein matching apertures adapted to receive securing elements whereby, when the securing elements are inserted, the bow portion and the handle portion constitute a solid unit, the plate on said bow portion having its edges formed to receive and partially surround said tubular side elements in pressure contact therewith at substantially all points on said edges.

2. The structure of claim 1, characterized by and including a cross-piece at the top of said handle and secured to the upper ends of said tubular elements.

3. The structure of claim 1, characterized by and including a cross-piece at the top of said handle portion and secured to said tubular elements, and a plate secured to said cross-piece and to the upper ends of said tubular elements, said cross-piece having webs at its opposite side edges.

4. In a demountable handle and control assembly for motor-driven lawn mowers, a bow portion having ends adapted to be secured to the opposite sides of the chassis of a lawn mower, an intermediate connection, adjustable as to length, adapted to provide an angular adjustment between the lawn mower and the handle structure, extending angularly from the plane of said bow portion, a handle portion adapted to be removably secured to said bow portion, a control rod, adjustable as to length, and adapted to be secured to an operating part of a lawn mower, and an actuating lever mounted adjacent the upper end of said handle portion, to which the upper end of said control rod is secured.

MILFORD D. BURROWS.
EUGENE L. BOYCE.

REFERENCES CITED

The following references are of record in the file of this patent:

UNITED STATES PATENTS

| Number | Name | Date |
|---|---|---|
| 1,319,627 | Sentinella | Oct. 21, 1919 |
| 1,902,524 | Roth | Mar. 21, 1933 |
| 2,296,415 | Baker | Sept. 22, 1942 |
| 2,374,533 | Fulton | Apr. 24, 1945 |
| 2,445,797 | Moore | July 27, 1948 |
| 2,458,200 | Renfroe | Jan. 4, 1949 |
| 2,468,839 | Rodesci | May 3, 1949 |